United States Patent [19]
Keng et al.

[11] Patent Number: 5,883,671
[45] Date of Patent: Mar. 16, 1999

[54] METHOD AND APPARATUS FOR PARTITIONING COMPRESSED DIGITAL VIDEO BITSTREAM FOR DECODING BY MULTIPLE INDEPENDENT PARALLEL DECODERS

[75] Inventors: Tan Thiow Keng; Khor Chee Siong, both of Singapore, Singapore

[73] Assignee: Matsushita Electric Industrial Co., Ltd., Osaka, Japan

[21] Appl. No.: 869,861

[22] Filed: Jun. 5, 1997

[30] Foreign Application Priority Data

Jun. 5, 1996 [JP] Japan .................................. 8-142409

[51] Int. Cl.$^6$ ..................................................... H04N 7/26
[52] U.S. Cl. ........................................... 348/397; 348/448
[58] Field of Search ..................................... 348/397, 412, 348/413, 415, 416, 446, 448, 459, 911

[56] References Cited

U.S. PATENT DOCUMENTS

| | | | |
|---|---|---|---|
| 4,980,765 | 12/1990 | Kudo et al. ............................. | 348/716 |
| 5,057,911 | 10/1991 | Stec et al. ............................... | 348/642 |
| 5,130,797 | 7/1992 | Murakami ............................... | 348/416 |
| 5,170,259 | 12/1992 | Niihara .................................... | 348/415 |
| 5,227,876 | 7/1993 | Cucchi .................................... | 348/484 |
| 5,337,153 | 8/1994 | Takayama ............................... | 348/441 |
| 5,353,063 | 10/1994 | Yagisawa et al. ....................... | 348/426 |
| 5,379,070 | 1/1995 | Retter ...................................... | 348/403 |
| 5,434,629 | 7/1995 | Pearson ................................... | 348/721 |
| 5,485,215 | 1/1996 | Meyer et al. ............................ | 348/423 |
| 5,510,842 | 4/1996 | Phillips ................................... | 348/416 |
| 5,646,690 | 7/1997 | Yoon ....................................... | 348/416 |

OTHER PUBLICATIONS

Michael A. Isnardi, Terrence R. Smith, and Barbara J. Roeder, David Sarnoff Research Center, "Decoding Issues in the ACTV System", IEEE Transactions on Consumer Electronics, vol. 34, No. 1, Feb. 1988, pp. 111–120.

Huifang Sun, David Sarnoff Research Center, "Hierarchical Decoder for MPEG Compressed Video Data", IEEE Transactions on Consumer Electronics, vol. 39, No. 3, Aug. 1993, pp. 559–564.

Albrecht C. Mayer, "The Architecture of a Processor Array for Video Decompression", IEEE Transactions on Consumer Electronics, vol. 39, No. 3, Aug. 1993, pp. 565–569.

Arun Netravali, Eric Petajan, Scott Knauer, Kim Matthews, Robert J. Safranek, and Peter Westerlink, AT&T Bell Laboratories, "A High Quality HDTV Codec", IEEE Transactions on Consumer Electronics, vol. 37, No. 3, Aug. 1991, pp. 320–330.

Tianmin Liu and Werner F. Wedam, "Hardware Implementation and Cost of Decoders for Digital HDTV", IEEE Transactions on Consumer Electronics, vol. 37, No. 3, Aug. 1991, pp. 331–336.

Primary Examiner—Howard Britton
Attorney, Agent, or Firm—Ratner & Prestia

[57] ABSTRACT

It is well known that interlaced video result in flicker artifacts that are annoying and tiring for the viewer. The technology for displaying progressive video have improved over the years and is now feasible. At the same time digital video compression have also advanced with the introduction of MPEG2 standard. However digital progressive video requires a lot of processing power. A method of decoding compresses digital video of a progressive video sequences at 60 frames per second using multiple decoders operating at 30 frames per second is disclosed in this invention. This invention describes the method and apparatus by which the compress digital video bitstream can be partition into independent units that can be decoded by the multiple decoders in parallel.

8 Claims, 5 Drawing Sheets

METHOD AND APPARATUS FOR PARTITIONING COMPRESSED DIGITAL VIDEO BITSTREAM FOR DECODING BY MULTIPLE INDEPENDENT PARALLEL DECODERS

BACKGROUND OF THE INVENTION

1. Field of the Invention

The present invention relates to the field of digital video compression and decoding. In particular it enables a compressed video bitstream to be decoded by multiple decoders each of which has a lower decoding frame rate capability than that of the target display frame rate.

2. Related art of the Invention

Most video material today are available in interlaced format at 60 fields per second. Interlaced format introduces many artifacts such as screen flicker that are annoying to the viewer. With current display technology it is now possible to display progressive format at 60 frames per second. This means that the viewer need not have to content with the interlace artifacts. In fact by using progressive format the subjective image quality is improved significantly.

MPEG 2 is the latest international standard for coding digital video. The digital video is compressed into bitstreams that can be decoded by a decoder for display. Using the Main Profile at High Level it is possible to code progressive video at 60 frames per second. The current invention deals with the method for achieving the above decoding method.

Currently decoder chips conforming to the Main Profile at Main Level are available and are able to decode compressed bitstream at up to 30 frames per second. In order to decode at twice the frame rate required by the progressive format a faster decoder have to be designed. On the other hand, the mismatch in the decoding and display frame rate can be solve by using more than one decoder in parallel. However the solution is not as trivial as simply to put two decoders together and dividing up the bitstream among the decoders. The reason is that the compressed bitstream is organized in groups of pictures, GOP, and each GOP contains intra coded pictures, I-pictures, forward predicted pictures, P-pictures, as well as bidirectionally coded pictures, B-pictures. This is depicted in FIG. 1 which shows the organization of the bitstream for the I-, P- and B-pictures in transmission order starting from left to right.

It is not possible to simply assign one GOP to one decoder because the decoding of the first two B-pictures in the GOP requires the reference to the last P-picture of the previous GOP as shown in FIG. 2. Similarly it is not feasible to partition the bitstream at the position indicated by the arrow in FIG. 2 as the P-picture after the arrow requires the reference to the preceding I-picture. Since more than one decoder is used in parallel, and each decoder only receives its share of the bitstream the reference picture will not be available at the boundary where the bitstream is partitioned. If we simply duplicate the bitstream then there will be a duplication of the I-picture and B-pictures at the boundary of the GOP.

SUMMARY OF THE INVENTION

The invention intend to enable a compressed video bitstream to be decoded by multiple decoders each of which has a lower decoding frame rate capability than that of the target display frame rate.

That is the present invention solves the above problem by partitioning the bitstream in such a manner that the necessary part of the bitstream corresponding to the reference pictures are duplicated so that the reference pictures would be available where they are needed.

Further more, even though these reference pictures are decoded in more than one decoder, only one of them will be displayed.

FIG. 3 shows the method by which the current invention partitions the input bitstream into different sections to be decoded by multiple decoders. All the B-pictures immediately following the I-picture at the start of a GOP requires the reference to the P-picture from the previous GOP.

Since this information is not available in the current decoder, all these B-pictures are discarded as shown in FIG. 3 (space is the discarded part). We now have a shortage of B-pictures in the GOP. However, since the last P-picture of the current GOP is used by the B-pictures in the next GOP, the bitstream from the beginning of the next GOP including the I-picture, B-pictures and the first P-picture is appended to the bitstream of the current GOP. This then allows the shortage of the B-pictures to be solved. However, there is an extra I-picture in the GOP now since the same I-picture is decoded in the next GOP. Therefore, in the current GOP the I-picture is decoded for reference by the B-pictures but not used in the display. The last P-picture in the GOP is used as a marker to indicate the end of the GOP. It is not decoded nor displayed.

FIG. 4 shows the timing of the operations in one of the decoder. The decoder (A) accepts the bitstream for one GOP less the B-pictures before the first P-picture and the front portion of the next GOP up to and including the first P-picture of that GOP. It then decodes the bitstream into the reconstructed pictures as normal with the exception of the last P-picture which is not decoded. The reconstructed pictures are then sent to the display in their display order with the exception of the last O-picture which is decoded but not displayed.

PREFERRED EMBODIMENTS

This embodiment describes the current invention using an apparatus consisting of three decoders working in parallel. Note that even though the decoders are working in parallel no two decoders are actually in phase at any one time. In fact they are always 120 degrees out of phase from one another.

Figure 1:
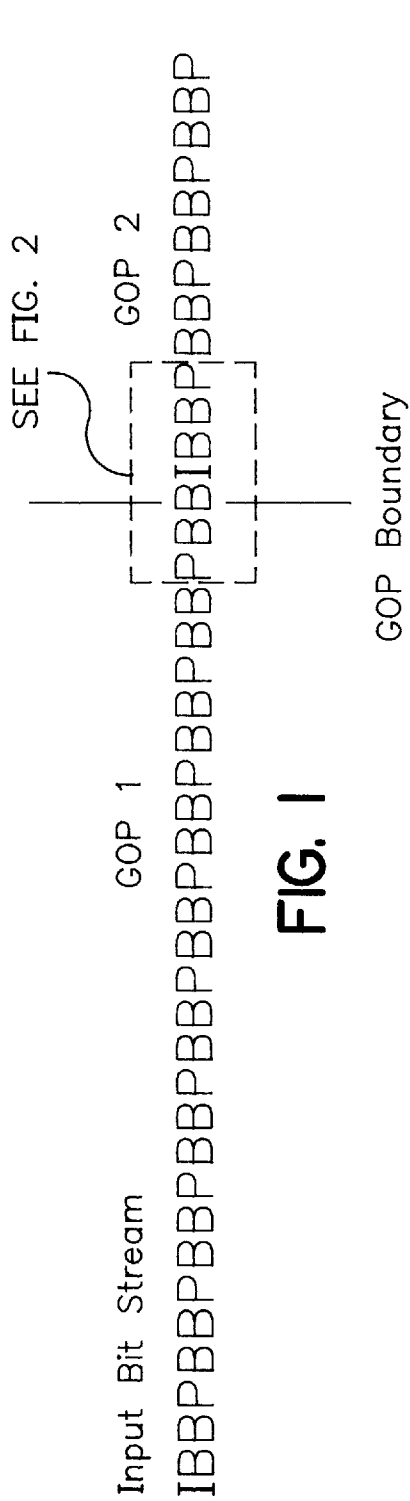
FIG. 1 illustrates the transmission order of the pictures within the bitstreams. It shows how the I-, P- and B-pictures are organized into group of pictures and how the group of pictures forms the bitstream.
Figure 2:
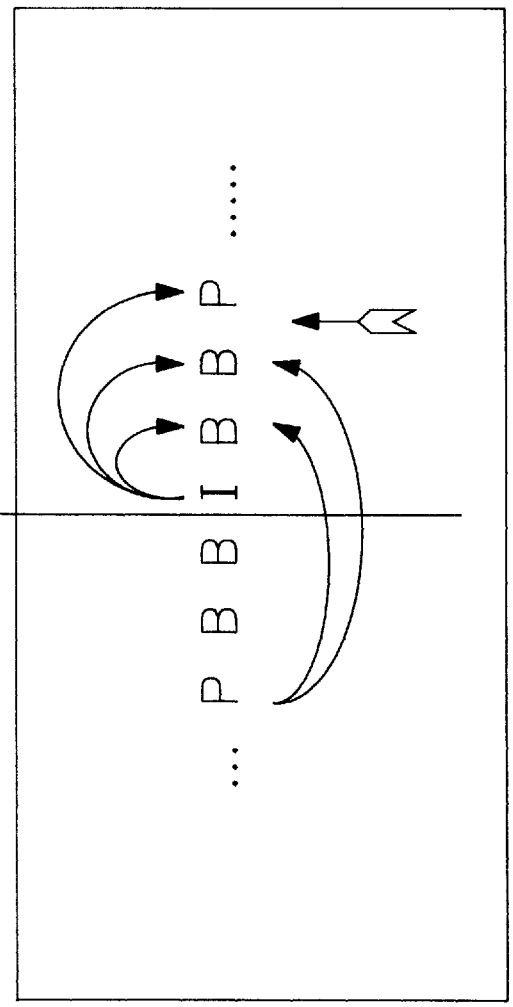
FIG. 2 highlights the problem of partitioning the bitstream at the GOP boundary. It shows the dependency of the B- and P-pictures which prevents the stream from being partitioned into two independent stream.
Figure 3:
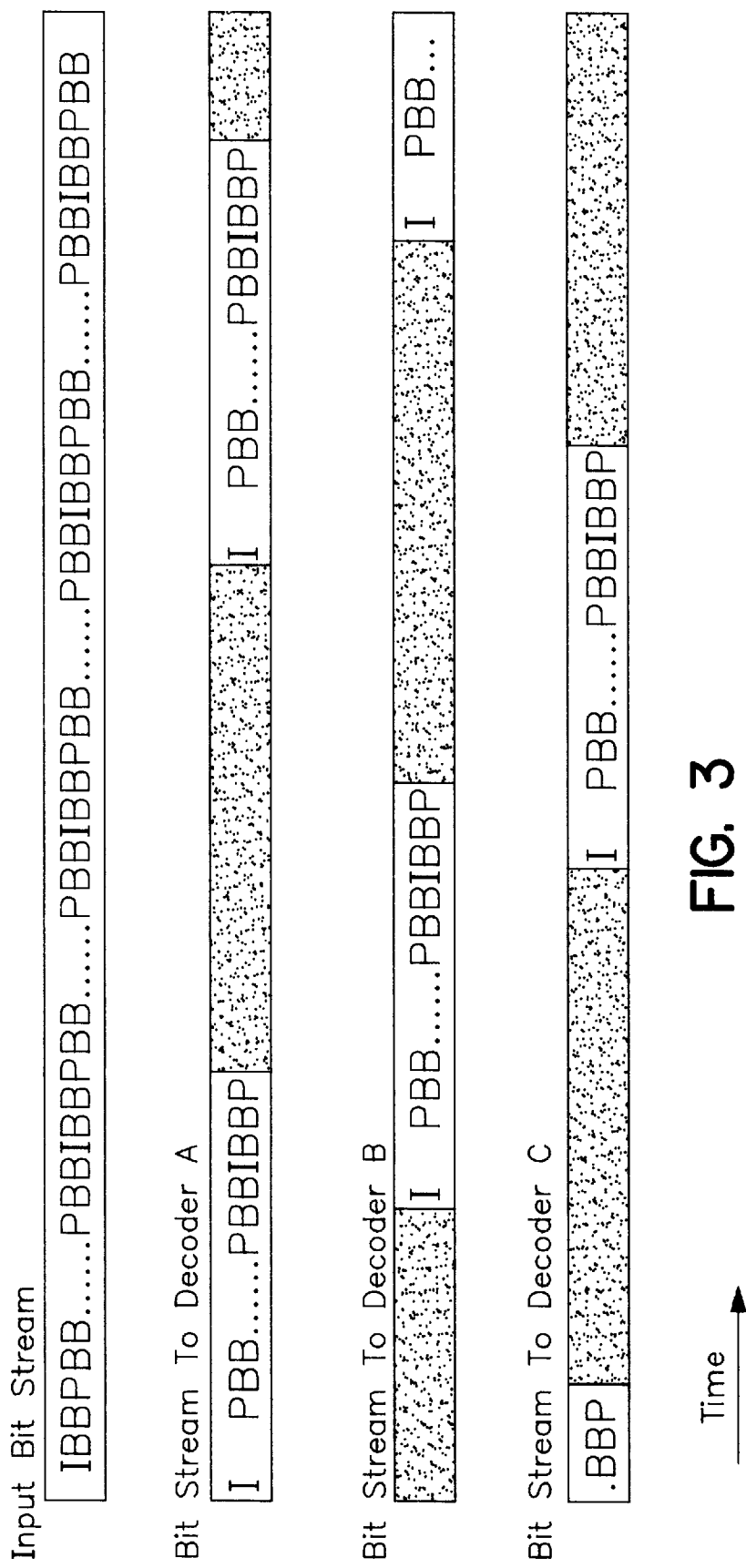
FIG. 3 shows the current invention where the bitstream is partitioned into three separate streams and passed into three different decoders. It shows the bitstream belonging to the pictures at the boundary which are duplicated or removed.
Figure 4:
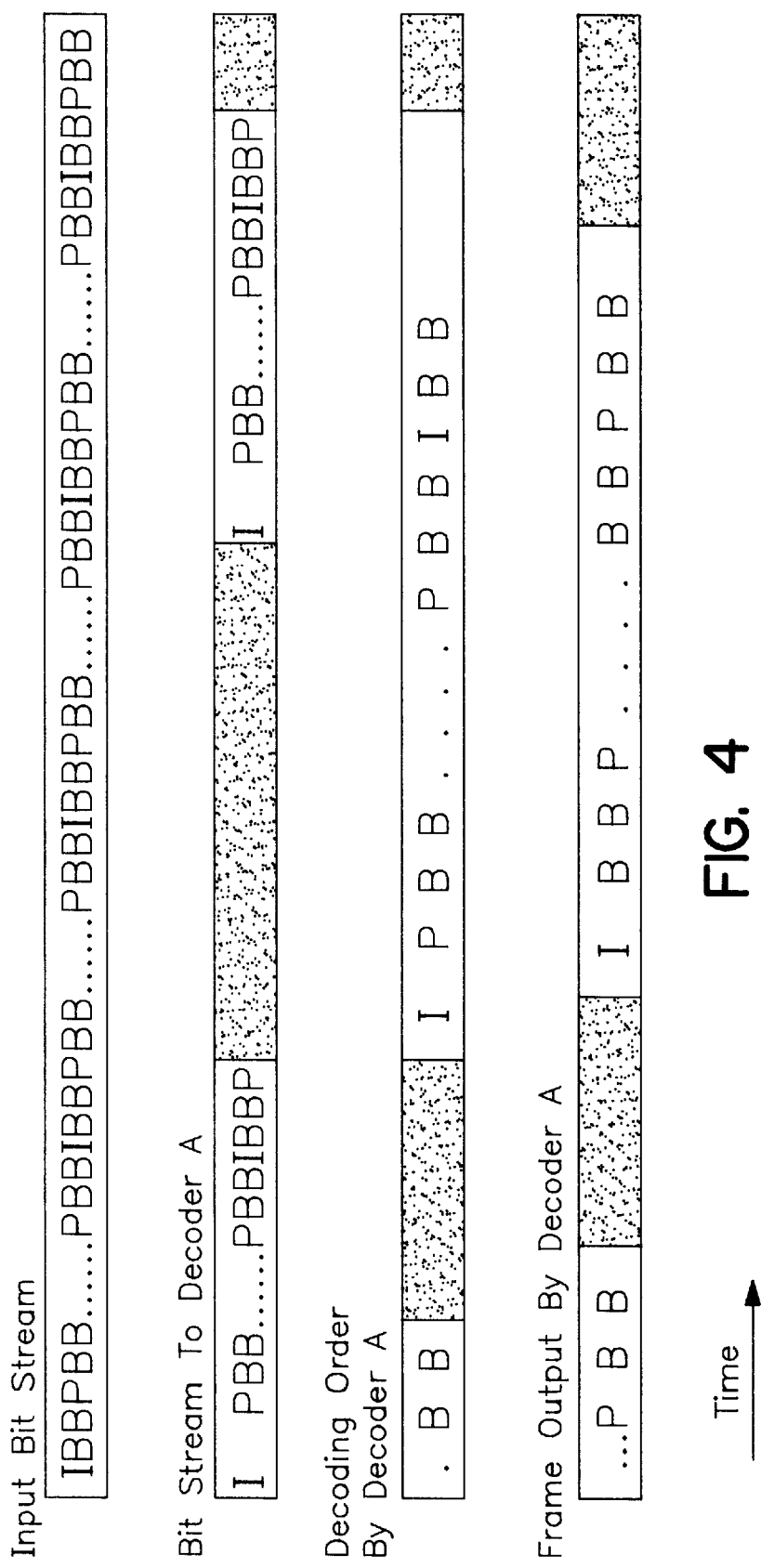
FIG. 4 shows the relative timing for the operation of one decoder (decoder A). It shows the input bitstream, decoding operation and the output operation in relative frame time.
Figure 5:
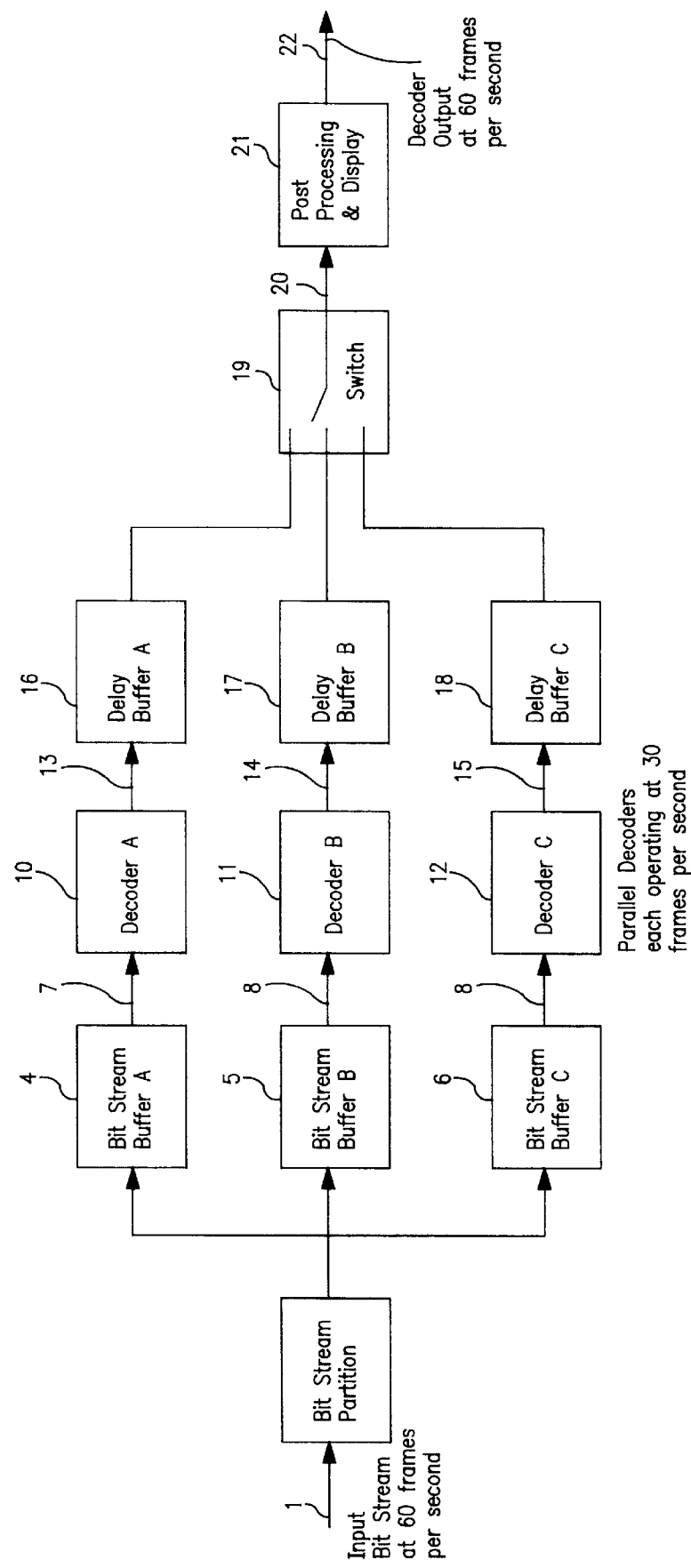
FIG. 5 illustrates the block diagram for an apparatus consisting of three parallel decoders.

FIG. 5 shows the block diagram of the apparatus using three parallel decoders (A, B and C). The bitstream, 1, arrives at a rate of 60 frames per second. It is then partitioned in the bitstream partitioning module, 2, which will be described below. The partitioned bitstream, 3, is then placed in the input buffer of the respective decoders, 4, 5 or 6 in turn. From the buffer the bitstreams are passed through lines 7, 8 and 9 to the decoders, 10, 11 and 12, respectively, where they are decoded into the reconstructed pictures at 30 frames per second. The decoded pictures are then passes through lines 13, 14 and 15 to the delay buffers 16, 17 and 18, respectively. From the delay buffers the pictures are extracted one at a time in their display order at 60 frames per second via the switch, 19. From the switch the picture is passed through line 20 to the post-processing and display module, 21, where chrominance up-sampling and other filtering is done. The digital signal is then converted into analogue signal and passed through line 22 to the display.

Figure 6:
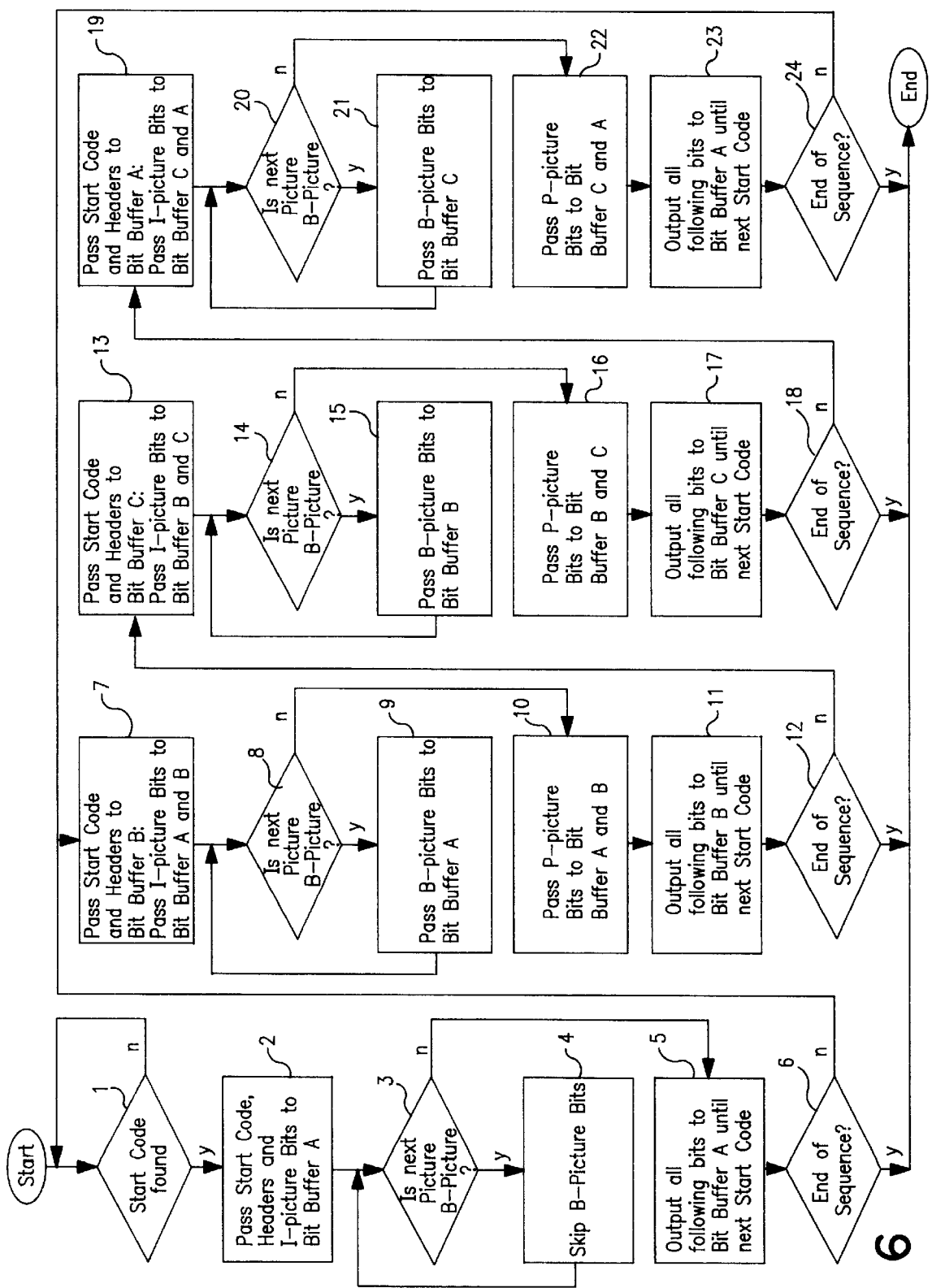
FIG. 6 shows the flow chart for the partitioning of the bitstream.

FIG. 6 shows the flow chart for the partitioning of the bitstream. The operation of this module is as follows. The processing can be divided into one initial phase and three operating phases which shall be referred to as phase A, B and C.

In the initial phase, the module 2 first looks for the start of the sequence. When this is found the processing is passed to block 2 where all the start code and headers and the bits for the I-picture are put into the bit buffer 4 of decoder A. Block 3 and 4 then skips over all the bits for the B-pictures following the I-picture but before the first P-picture. This bits are discarded because the B-pictures cannot be decoded due to the missing reference picture. In block 5 all the remaining bits for the GOP are put into the bit buffer of decoder A.

In phase A, if it is not the end of the sequence, the processing is passed to block 7 where the start code and headers are put into the bit buffer of decoder B. After that the bits for the I-picture are put into the bit buffer of A and B. Blocks 8 and 9 then put all the bits of the B-pictures following the I-picture but before the first P-picture into the bit buffer of decoder A. Next in block 10 the bits for the P-picture are put into the bit buffers of decoder A and B. After that all remaining bits for the GOP are put into the bit buffer of decoder B.

In phase B, if it is not the end of the sequence, the processing is passed to block 13 where the start code and headers are put into the bit buffer of decoder C. After that the bits for the I-picture are put into the bit buffer of B and C. Blocks 14 and 15 then put all the bits of the B-pictures following the I-picture but before the first P-picture into the bit buffer of decoder B. Next in block 16 the bits for the P-picture are put into the bit buffers of decoder B and C. After that all remaining bits for the GOP are put into the bit buffer of decoder C.

In phase C, if it is not the end of the sequence, the processing is passed to block 19 where the start code and headers are put into the bit buffer of decoder A. After that the bits for the I-picture are put into the bit buffer of C and A. Blocks 20 and 21 then put all the bits of the B-pictures following the I-picture but before the first P-picture into the bit buffer of decoder C. Next in block 22 the bits for the P-picture are put into the bit buffers of decoder C and A. After that all remaining bits for the GOP are put into the bit buffer of decoder A.

If it is not the end of the sequence then the processing is repeated by going back to phase A. If the end of sequence is reach then the processing is stop and the search for the start of the next sequence is initiated again.

With the current invention it is possible to implement a progressive 60 frames per second decoder using existing decoders that were designed for operations at 30 frames per second. This allows the design and implementation time to be shorten and prototypes to be built without incurring the cost and time of designing a completely new 60 frames per second decoder.

What is claimed is:

1. A method for partitioning compressed digital video bitstream, made up of a plurality of group of pictures, each containing intra coded pictures, forward predicted pictures and bi-directionally predicted pictures, into a plurality of segments such that each segment can be independently decoded by a separate decoder, comprising the steps of partitioning the bitstream such that each of the plurality of decoders would in turn receive a segment of the bitstream;

decoding each of the said segments of bitstream in the said plurality of decoders; and outputting from the decoder, selected decoded pictures in their display order.

2. A method of partitioning the bitstream according to said claim 1 where each of the plurality of decoders would in turn receive a segment of the bitstream consisting of a current group of pictures in its entirety except for the bi-directionally predicted pictures located immediately after a first intra coded picture but before a first forward predicted picture of the said current group of picture; and the beginning of the next group of pictures up to and including the first forward predicted picture in the said next group of pictures.

3. A method of decoding the segments of bitstream partitioned by the method according to claim 1 or 2 comprising of the following steps of decoding the first intra coded picture, the first predicted picture and the rest of the pictures of the said current group of pictures;

decoding the intra coded picture of the next group of pictures; and decoding all the bi-directionally predicted pictures following the said intra coded picture and stopping at the first predicted picture of the said next group of pictures.

4. A method of outputting for display all the decoded pictures in the display order according to claim 1 whereby any duplicated pictures are only displayed once.

5. An apparatus for decoding a coded video bitstream using a plurality of decoders operating in parallel each having a picture decoding rate that is less than an intended display picture rate, the apparatus comprising:

means for receiving a compressed video bitstream including a plurality of group of pictures, each containing intra coded pictures, forward predicted pictures, and bi-directionally predicted pictures;

means for partitioning the compressed video bitstream into segments such that each of the plurality of decoders receives a segment of the bitstream;

means for decoding each of the segments using the plurality of decoders to produce decoded pictures;

means for discarding any duplicated ones of the decoded pictures; and means for collecting the decoded pictures from the plurality of decoders and displaying them in the display order.

6. An apparatus for partitioning the bitstream according to claim 5 comprising:

means for selecting the bitstream corresponding to a current group of pictures in its entirety and excluding the bi-directionally predicted pictures located immediately after a first intra coded picture but before a first forward predicted picture of the current group of pictures; and means for also selecting a beginning of a next group of pictures up to and including a first forward predicted picture in the next group of pictures.

7. An apparatus for decoding a coded video bitstream using a plurality of decoders operating in parallel each having a picture decoding rate that is less than an intended display picture rate, the apparatus comprising:

means for receiving a compressed video bitstream including a plurality of group of pictures, each containing intra coded pictures, forward predicted pictures, and bi-directionally predicted pictures;

means for partitioning the compressed video bitstream into segments such that each of the plurality of decoders receives a segment of the bitstream;

decoding means for decoding each of the segments using the plurality of decoders to produce decoded pictures, the decoding means including:
  (a) means for decoding the first intra coded picture, the first predicted picture, and the remaining pictures of the current group of pictures (b) means for decoding an intra coded picture of a next group of pictures; and
  (c) means for decoding all bi-directionally predicted pictures following the intra coded picture and terminating decoding at a further first predicted picture of a further next group of pictures;

means for discarding any duplicated ones of the decoded pictures; and means for collecting the decoded pictures from the plurality of decoders and displaying them in the display order.

8. An apparatus for partitioning the bitstream according to claim 7 comprising:

means for selecting the bitstream corresponding to a current group of pictures in its entirety and excluding the bi-directionally predicted pictures located immediately after a first intra coded picture but before a first forward predicted picture of the current group of pictures; and means for also selecting a beginning of a next group of pictures up to and including a first forward predicted picture in the next group of pictures.

* * * * *

UNITED STATES PATENT AND TRADE MARK OFFICE
CERTIFICATE OF CORRECTION

PATENT NO.   : 5,883,671
DATED        : March 16, 1999
INVENTOR(S)  : Keng et al.

It is certified that error appears in the above-identified patent and that said Letters Patent is hereby corrected as shown below:

Column 4, line 32, delete " 1 or 2" and insert -- 2 --.

Signed and Sealed this

Twelfth Day of October, 1999

Attest:

Q. TODD DICKINSON

Attesting Officer

Acting Commissioner of Patents and Trademarks